United States Patent
Brockman

(10) Patent No.: US 7,422,280 B2
(45) Date of Patent: Sep. 9, 2008

(54) FOLDABLE HEADREST ASSEMBLY

(75) Inventor: Mark Anthony Brockman, Belle River (CA)

(73) Assignee: Windsor Machine & Stamping Limited, Windsor, Ontario (CA)

( * ) Notice: Subject to any disclaimer, the term of this patent is extended or adjusted under 35 U.S.C. 154(b) by 0 days.

(21) Appl. No.: 11/697,056

(22) Filed: Apr. 5, 2007

(65) Prior Publication Data

US 2007/0236070 A1   Oct. 11, 2007

Related U.S. Application Data

(60) Provisional application No. 60/790,419, filed on Apr. 7, 2006.

(51) Int. Cl.
  *B60N 2/427* (2006.01)
  *B60N 2/48* (2006.01)
  *B60R 21/055* (2006.01)
  *B60R 21/02* (2006.01)
  *B60R 21/00* (2006.01)

(52) U.S. Cl. ................... 297/216.12; 297/408
(58) Field of Classification Search ............ 297/216.12, 297/408
  See application file for complete search history.

(56) References Cited

U.S. PATENT DOCUMENTS

| | | | |
|---|---|---|---|
| 4,370,898 A | 2/1983 | Maruyama | |
| 4,678,232 A | 7/1987 | Ishida et al. | |
| 5,738,411 A | 4/1998 | Sutton et al. | |
| 5,826,942 A | 10/1998 | Sutton et al. | |
| 6,033,018 A | 3/2000 | Fohl | |
| 6,045,181 A | 4/2000 | Ikeda et al. | |
| 6,203,104 B1 | 3/2001 | Matsuo et al. | |
| 6,478,373 B1 * | 11/2002 | Hake et al. | 297/216.12 X |
| 6,802,562 B1 * | 10/2004 | Hake et al. | 297/216.12 |
| 6,935,696 B2 | 8/2005 | Gauthier et al. | |
| 7,017,989 B2 | 3/2006 | Yamaguchi et al. | |
| 7,048,334 B2 | 5/2006 | Pal et al. | |
| 7,070,240 B2 | 7/2006 | Schmitt et al. | |
| 7,325,877 B2 * | 2/2008 | Brockman et al. | 297/408 |
| 2005/0225146 A1 | 10/2005 | Sutter, Jr. et al. | |
| 2005/0242640 A1 | 11/2005 | Barko et al. | |
| 2006/0006709 A1 * | 1/2006 | Uno et al. | 297/216.12 |
| 2006/0061187 A1 | 3/2006 | Gauthier et al. | |
| 2007/0152487 A1 * | 7/2007 | Brockman et al. | 297/408 |
| 2008/0012402 A1 * | 1/2008 | Sekida | 297/216.12 |

* cited by examiner

*Primary Examiner*—Rodney B. White
(74) *Attorney, Agent, or Firm*—Howard & Howard Attorneys, P.C.

(57) ABSTRACT

A foldable headrest assembly for a seat includes a pair of posts engaged with an upper portion of the seat and a frame rotatably supported by the posts. A latch is moveably supported by the frame and includes a release pin. A release mechanism is coupled to the latch for moving the latch from a locked position preventing rotation of the frame relative to the posts to an unlocked position allowing rotation of the frame relative to the posts. The assembly further includes an inertia lock rotatably coupled to the frame. The inertia lock defines a stop slot corresponding to the release pin. In response to deceleration of the frame, e.g., resulting from a collision of the vehicle, the inertia lock rotates to a triggered position whereby the stop slot receives the release pin and limits movement of the release pin thereby maintaining the latch in the locked position.

20 Claims, 5 Drawing Sheets

FOLDABLE HEADREST ASSEMBLY

CROSS-REFERENCE TO RELATED APPLICATIONS

The subject patent application claims priority to and all the benefits of U.S. Provisional Patent Application Ser. No. 60/790,419 which was filed on Apr. 7, 2006, the entire specification of which is expressly incorporated herein by reference.

BACKGROUND OF THE INVENTION

1. Field of the Invention

The subject invention relates to headrests for vehicle seats, and more particularly, to a foldable headrest assembly that allows for compact storage of vehicle seats.

2. Description of the Related Art

Automobile consumers are increasingly demanding multipurpose vehicles that can be modified to transport either people or cargo. For example, a pickup truck is useful for transporting cargo, but it is inadequate transportation for a modest sized family. Conversely, a mid-sized sedan provides sufficient seating for a typical family, but this same sedan lacks utility when the owner needs to transport a large object, such as furniture. Foldable or removable seats solve these problems by providing the option for changing seat space into cargo space and vice-versa. The foldable seats fold into space saving configurations such that the vehicle may transport cargo.

Headrests situated on an upper portion of the seats provide support for an occupant's head and may provide comfort and offer safety protection from accident and crash related injuries, e.g., whiplash. However, the headrest introduces a problem in a vehicle with foldable seats. Ideally, a seat occupies a minimal volume once folded into a storage position. However, the headrest is an extension of the seat, thereby adding to the volume occupied by a folded seat and subtracting from the available cargo space in a vehicle.

For this reason, some prior art folding seats lacked headrests. However, a seat lacking a headrest is undesirable due to the safety and ergonomic benefits provided by the headrest. Alternatively, some folding seat designs required the complete removal of the seat from the vehicle to maximize cargo space. However, the procedure for removing and reattaching the seat is awkward and complicated. Removal can also be impractical when there is not a convenient place to store the removed seat. In yet another alternative, the foldable seats have removable headrests, as disclosed in U.S. Pat. No. 6,203,104. However, a detached headrest poses additional problems with storage of the headrest when the seat is in a folded or storage position. Additionally, the headrest may be lost or damaged during the removal and storage.

An improvement in the headrest design for foldable seats includes foldable headrests that allow the headrest to fold from an upright position to a forwardly folded position. In the forwardly folded position the foldable headrest is positioned against the upper portion of the seat. One such headrest is disclosed in U.S. Pat. No. 5,826,942. However, the previous foldable headrests included rather complicated locking mechanisms for moving the foldable headrest between the forwardly folded securing the headrest into a position. In addition, the previous foldable headrests are not securely locked in the event of a collision, accident, or sudden stop of the vehicle. As a result, the foldable headrests of the prior art may undesirably unlock and move from the upright position to the forwardly folded position during such an event.

SUMMARY OF THE INVENTION AND ADVANTAGES

A foldable headrest assembly for a seat comprises a post for engagement with an upper portion of the seat. The foldable headrest assembly further includes a frame extending between a first end and a second end with the first end rotatably supported by the post for selective rotation of the frame relative to the post about a first axis. A latch is moveably supported by the first end of the frame and a release pin is mounted to the latch for movement with the latch. A release mechanism is coupled to the latch for moving the latch and the release pin between a locked position with the latch engaging the post to prevent rotation of the frame about the first axis and an unlocked position with the latch disengaged from the post to allow rotation of the frame about the first axis. An inertia lock is rotatably coupled to the frame for rotation from a neutral position to a triggered position in response to deceleration of the frame. The inertia lock defines a stop slot dimensioned to catch the release pin in the triggered position and prevent the movement of the latch from the locked position to the unlocked position.

Accordingly, the present invention provides a foldable headrest assembly for compact storage within a vehicle. The foldable headrest assembly is easily rotated between an upright position and a forwardly folded position. Further, when the frame decelerates, e.g., when a vehicle is involved in a collision, the momentum of the inertia lock causes the inertia lock to rotate about the shaft to the triggered position. In the triggered position, the inertia lock prevents the latch from moving from the locked position to the unlocked position and thus prevents the frame from rotating to a forwardly folded position. As such, during a collision, the frame remains in an upright position and is prevented from inadvertently moving to the forwardly folded position.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, a foldable headrest assembly for a seat 22 of a vehicle 24 is shown generally at 20. The vehicle 24 may be any type of vehicle 24. For example, the vehicle 24 may be an automobile such as a car, a truck, a van, or a sport utility vehicle. Alternatively, the vehicle 24 may be a plane, a train, or a boat. Typically, the foldable headrest assembly 20 is secured to the seat 22 of the vehicle 24. For example, as discussed below, the foldable headrest assembly 20 may be slideably disposed in an upper portion of a back 26 of the seat 22.

Figure 1:
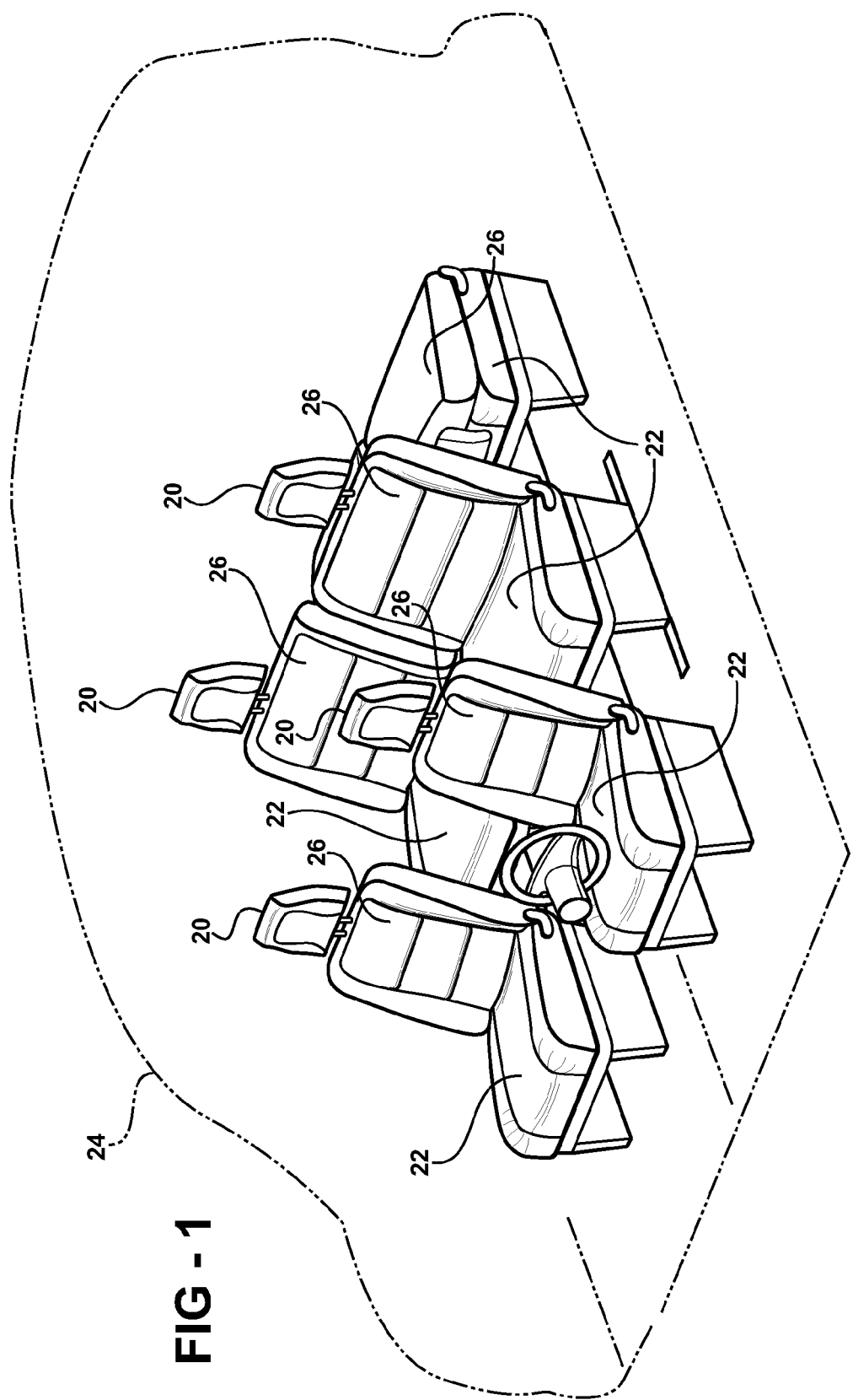
FIG. 1 is a perspective view of a vehicle with some seats in an upright position and some seats in a forwardly folded position.
Figure 2:
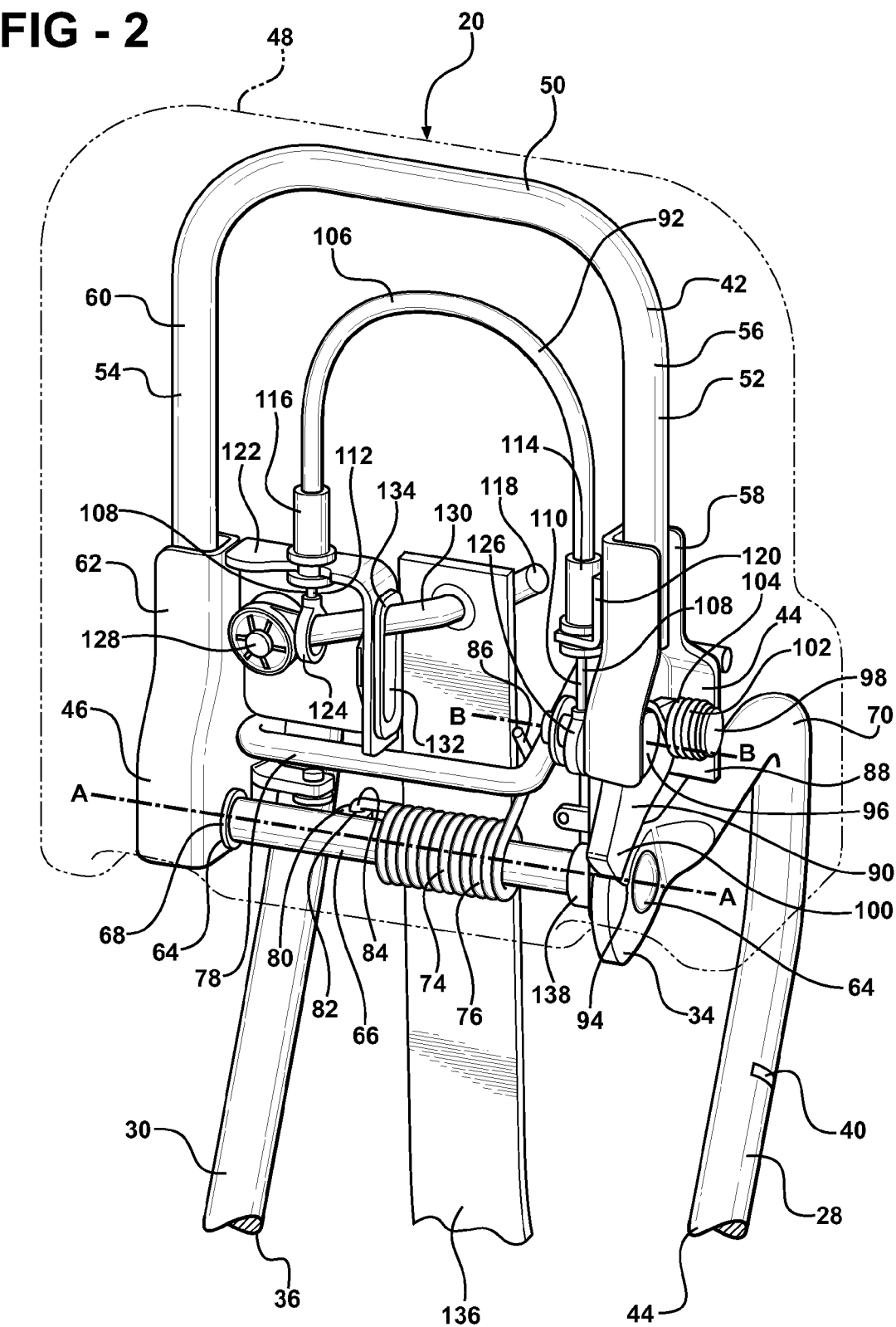
FIG. 2 is a perspective view of a foldable headrest assembly.
Figure 3:
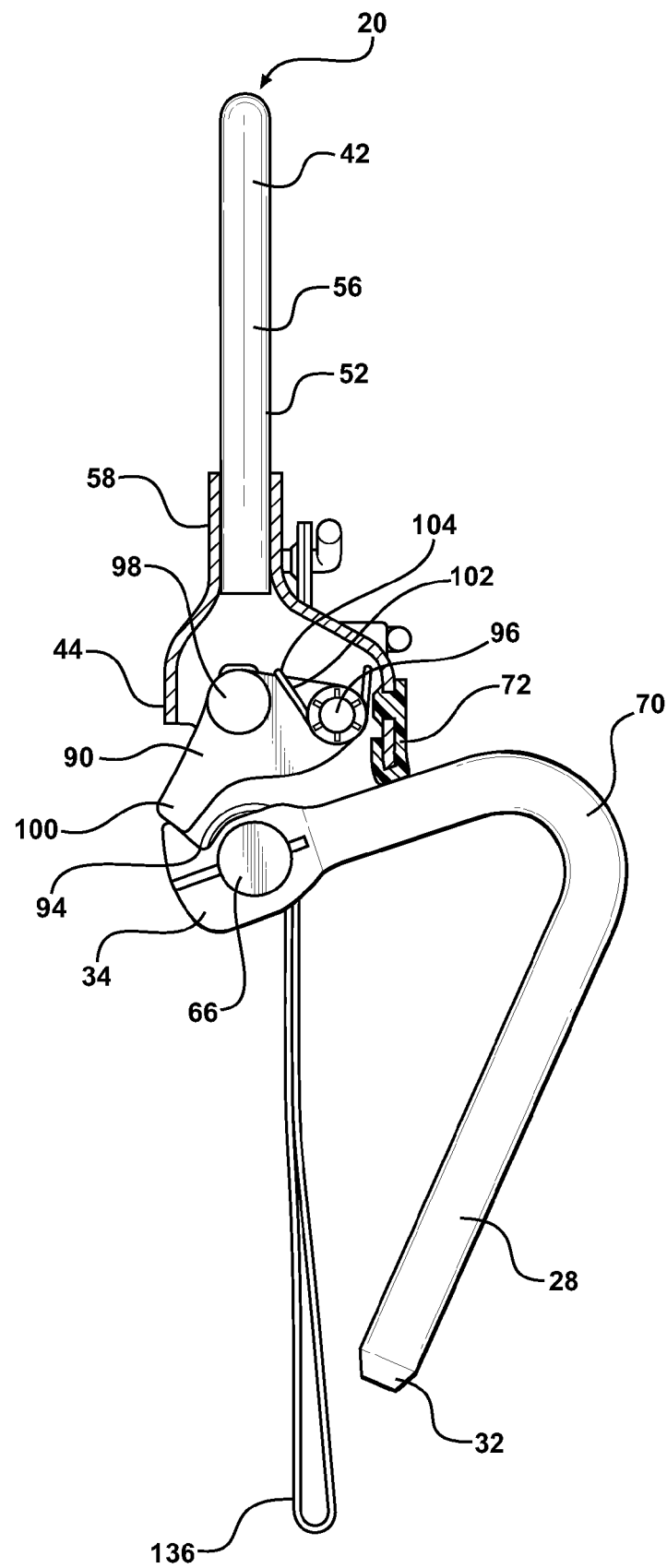
FIG. 3 is a right side view of a portion of the foldable headrest assembly of FIG. 2.
Figure 4:
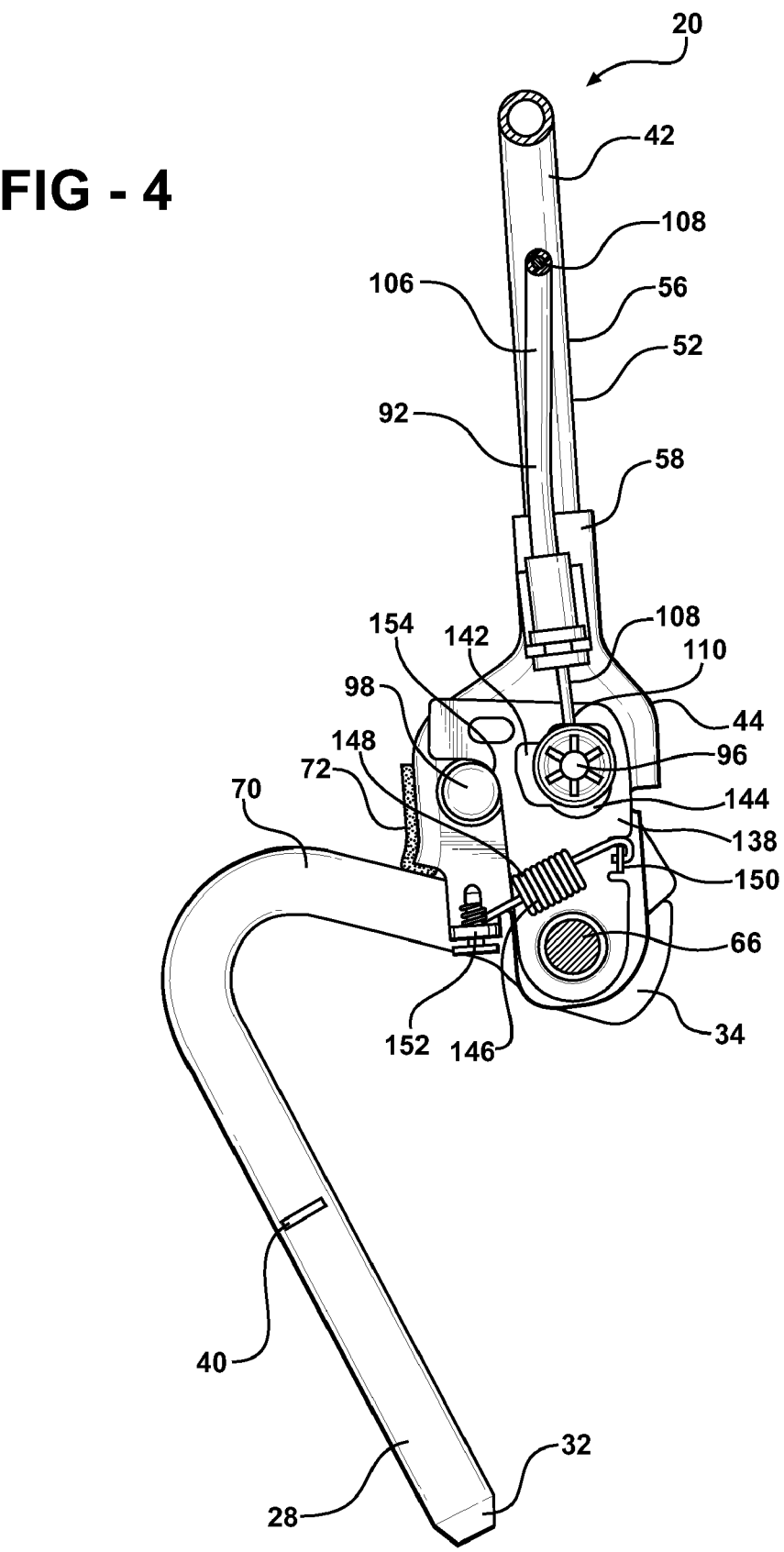
FIG. 4 is a left side view of a portion of the foldable headrest assembly of FIG. 2.

As shown in FIG. 1, the vehicle 24 may include a plurality of seats 22. For example, in FIG. 1 the two rear seats 22 and foldable headrest assemblies 20 are shown in a forwardly folded position and the two front seats 22 and two middle seats 22 are shown in an upright position. The foldable headrest assembly 20 in FIGS. 2-4 is shown in the upright position. As shown in FIG. 1, in the upright position the back 26 of the seat 22 is generally vertical and the foldable headrest assembly 20 extends upwardly from the back 26 of the seat 22. In the forwardly folded position the back 26 of the seat 22 is generally horizontal and the foldable headrest assembly 20 extends downwardly from the back 26 of the seat 22.

As shown in FIGS. 2-4, the foldable headrest assembly 20 includes a post 28 and a second post 30 for engagement with the upper portion of the seat 22. Specifically, the upper portion of the back 26 of the seat 22 receives the post 28 and the second post 30 and the posts 28 are slideably disposed in the upper portion of the back 26 of the seat 22. The post 28 extends from a first distal end 32 to a first paddle 34. The second post 30 is spaced from and in parallel with the first post 28 and extends from a second distal end 36 to a second paddle 38. The first and second posts 30 each further define a locator notch 40. The locator notch 40 may be utilized to properly locate and secure the posts 28 when slideably disposed in the upper portion of the back 26 of the seat 22. The posts 28 may be formed from a rigid material. As known in the art, the rigid material may be selected from the group of metals, polymers, plastics, woods, composites, and combinations thereof.

The foldable headrest assembly 20 further includes a frame 42 extending between a first end 44 and a second end 46 for supporting a headrest cover 48. The first end 44 is rotatably supported by the post 28 and the second end 46 is rotatably supported by the second post 30 for selective rotation of the frame 42 relative to the post 28 and the second post 30 about a first axis A.

Specifically, as shown in FIG. 2, the frame 42 is U-shaped with a base portion 50, a first arm 52, and a second arm 54. The first arm 52 extends from the base portion 50 and presents the first end 44. The second arm 54 is spaced from the first arm 52. The second arm 54 extends from the base portion 50 in parallel with the first arm 52 and presents the second end 46.

More specifically, the first arm 52 of the frame 42 includes a first rod 56 and a first plate 58 attached to the first rod 56 with the first plate 58 presenting the first end 44. The second arm 54 of the frame 42 includes a second rod 60 and a second plate 62 attached to the second rod 60 with the second plate 62 presenting the second end 46. The first and second plates 58, 62 rotatably support the rest of the frame 42 for rotation about the first axis A. The first and second plates 58, 62 rotate in unison about the first axis A between the upright position and the forwardly folded position. The rods 56, 60 and the plates 58, 62 are formed from a rigid material, such as a metallic material.

Each of the first end 44 of the frame 42, the second end 46 of the frame 42, the post 28, and the second post 30 define an aperture 64. A shaft 66 extends through and is rotatable in each of the apertures 64. Specifically, the first and second paddles 34, 38 each define the aperture 64 and the shaft 66 extends and is supported between the first paddle 34 and the second paddle 38 along the first axis A. The shaft 66 is formed from a rigid material, such as a metallic material. A bearing 68 may be disposed within the aperture 64 of each paddle 34, 38 and extends between the shaft 66 and the plates 58, 62 to reduce the frictional resistance of the rotation of the frame on the shaft 66. The bearings 68 may adapt to some manufacturing variation, thereby reducing the chance of binding or undesired looseness between the plates 58, 62 and the shaft 66.

The foldable headrest assembly 20 is lockable in the upright position to support an occupant's head. For example, as shown in FIGS. 2-4, the post 28 and the second post 30 each define a bend 70. The first and second plates 58, 62 each include a first stop 72 positioned to rest on the bends 70, respectively, for supporting the frame 42 in the upright position. In other words, the first stops 72 contact the bends 70, respectively, to limit rearward rotation of the frame when the frame 42 is in the upright position. The first stops 72 limit rearward rotation of the frame 42 to support the occupant's head. The first stops 72 may include outer sleeves for cushioning between the first stops 72 and the posts 28. The outer sleeves may be formed from a flexible material, such as a plastic or a rubber material.

The foldable headrest assembly 20 includes a frame biasing device 74 supported on the shaft 66 and coupled to the post 28, the second post 30, and the frame 42. The frame biasing device 74 urges the frame 42 toward the forwardly folded position. Specifically, as shown in FIGS. 2-4, the frame biasing device 74 is further defined as a first torsion spring 76. However, it should be appreciated that the frame biasing device 74 is not limited to a torsion spring, but may be any type of biasing device.

The frame 42 includes a brace 78 extending between and coupled to the first and second plates 58, 62. The first torsion spring 76 extends between and is attached to the shaft 66 and the brace 78. Specifically, in such a configuration the first torsion spring 76 is slideably disposed over the shaft 66. The shaft 66 presents a shaft lug 80 integrally extending outwardly from the shaft 66 in a transverse direction to the first axis A. The shaft lug 80 defines a lug hole 82. The first torsion spring 76 has a first hook end 84 extending toward engaging the lug hole 82 and a second hook end 86 extending toward and engaging the brace 78.

The first and second plates 58, 62 each define a second stop 88. The second stops 88 limit forward rotation of the frame 42 about the first axis A to define the forwardly folded position. The frame 42, when in the forwardly folded position, may allow the seat 22 to be compactly folded and stored within the vehicle 24, as shown by the two rear seats 22 in FIG. 1.

As shown in FIG. 2, the foldable headrest assembly 20 further includes a latch 90 and a release mechanism 92. The latch 90 is moveably supported by the first end 44 of the frame 42. The release mechanism 92 is coupled to the latch 90 for moving the latch 90 between a locked position and an unlocked position.

In the locked position the latch 90 engages the post 28 to prevent rotation of the frame 42 about the first axis A. In the unlocked position, the latch 90 is disengaged from the post 28 to allow rotation of the frame 42 about the first axis A. In other words, when the latch 90 is in the unlocked position, the headrest assembly 20 is free to rotate between the upright position and the forwardly folded position.

When the frame 42 is in the upright position the latch 90 secures the frame 42 against the biasing force of the first torsion spring 76. The release mechanism 92 rotates the latch 90 to the unlocked position and the biasing force of the first torsion spring 76 rotates the plates 58, 62 to the forwardly folded position. The foldable headrest assembly 20 may be returned to the upright position by manually rotating the frame 42 against the bias of the first torsion spring 76 until the latch 90 engages into the lock notch 94 of the first paddle 34 securing the frame 42 against the first stops 72.

Specifically, the headrest assembly 20 includes a release pin 96 mounted to the latch 90 for movement with the latch 90. As shown in FIG. 2, the foldable headrest assembly 20 includes a latch pivot pin 98 extending along a second axis B. The second axis B is offset from the release pin 96. The latch pivot pin 98 is coupled to the latch 90 and to the frame 42. In such a configuration, the latch 90 is rotatable relative to the frame 42 about the second axis B. In other words, the latch 90 rotates about the second axis B between the locked and unlocked positions.

Specifically, as shown in FIG. 2, the release mechanism 92 is coupled to the release pin 96. The release mechanism 92 applies force to the release pin 96 to rotate the latch 90 about the second axis B. A washer may be disposed on the latch pivot pin 98 for compensating any tolerance deviations between the latch 90 and first plate 58. It should be appreciated that the latch 90 may move between the locked and unlocked position in a manner other than rotation without departing from the nature of the invention. For example, the latch 90 may be moved by translational motion, e.g., may be slid, between the locked and unlocked positions.

The latch 90 includes a tooth 100 and the post 28 defines a lock notch 94 corresponding to the tooth 100. Specifically, the first paddle 34 of the post 28 defines the lock notch 94. The tooth 100 is engaged with the lock notch 94 in the locked position and the tooth 100 is disengaged with the lock notch 94 in the unlocked position. However, it should be appreciated that without departing from the nature of the present invention, the latch 90 and the post 28 may have any configuration that allows the latch 90 and the post 28 to engage in the locked position. It should also be appreciated that the location of the latch 90 and the lock notch 94 are not limited to the frame 42 and the post 28, respectively. For example the latch 90 may be disposed on the post 28 and the lock notch 94 may be defined on the frame 24 without departing from the nature of the present invention.

The foldable headrest assembly 20 includes a latch spring 102 supported by the latch pivot pin 98. The latch spring 102 is coupled to the latch 90 and to the first end 44 of the frame 42 for biasing the latch 90 toward the locked position. For example, as shown in FIGS. 2-3, the latch spring 102 is further defined as a second torsion spring 104. However, it should be appreciated that the latch spring 102 is not limited to a torsion spring, but may be any type of spring or biasing device.

Figure 5:
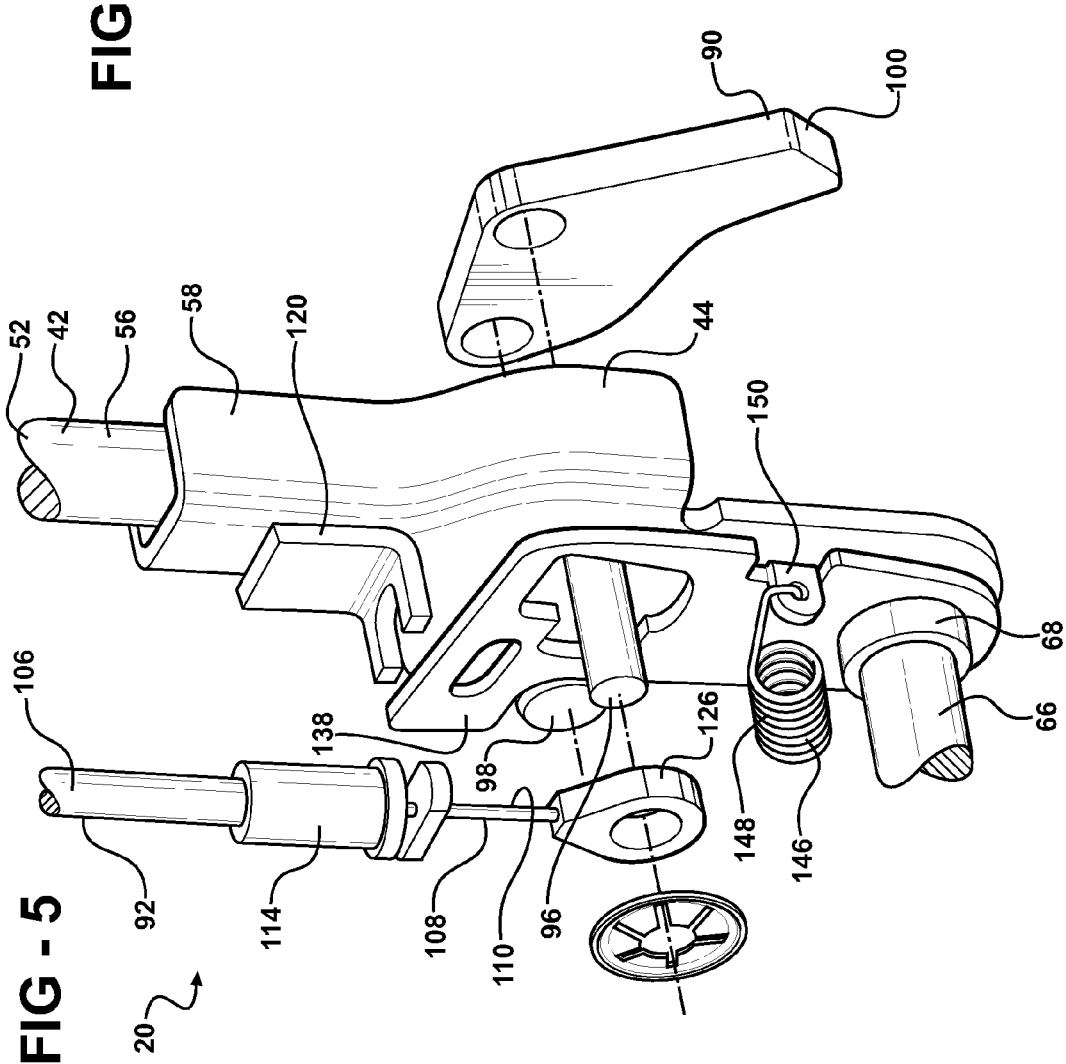
FIG. 5 is a perspective view of a portion of the foldable headrest assembly including a latch, a locking mechanism, and an inertia lock.

As shown in FIGS. 2 and 5, the release mechanism 92 includes a sheath 106 fixed relative to the frame 42 and a motion transmitting cable 108 extending in the sheath 106. The motion transmitting cable 108 extends between a first terminal 110 and a second terminal 112. The motion transmitting cable 108 is formed from a flexible material, such as a metallic cord. The sheath 106 is formed from a rigid material, such as a rigid plastic material.

As shown in FIG. 2, a first cap 114 and a second cap 116 are disposed on respective ends of the sheath 106 with the first terminal 110 of the motion transmitting cable 108 extending through the first cap 114 and with the second terminal 112 of the motion transmitting cable 108 extending through the second cap 116. The first and second caps 114, 116 are affixed to the frame 42 to maintain the sheath 106 in a fixed position relative to the frame 42. Specifically, the first plate 58 includes a cable anchor 120 and the first cap 114 is affixed to the cable anchor 120. A bracket 122 is attached to the second plate 62 and the second cap 116 is affixed to the bracket 122.

The first terminal 110 extends beyond the sheath 106 with the first terminal 110 coupled to the release pin 96 of the latch 90. Specifically, a first and second eyelet connector 126, 124 are disposed on the first and second terminals 110, 112, respectively, of the motion transmitting cable 108. The first eyelet 126 connector receives the release pin 96. The cable anchor 120 aligns the release cable with the release pin 96. A nut may be slideably disposed over the release pin 96 opposite the first plate 58 from the first eyelet connector 126 to retain the first eyelet connector 126 on the release pin 96.

The release mechanism 92 includes a fulcrum pin 128 fixed relative to the frame 42 and a pivot lever 130 coupled to and pivotal about the fulcrum pin 128. Specifically, the fulcrum pin 128 is attached to and extends from the bracket 122. The second terminal 112 extends beyond the sheath 106 with the second terminal 112 coupled to the pivot lever 130. Specifically, the second eyelet connector 124 slideably receives the pivot lever 130.

The bracket 122 defines a hole 132 that is oblong in shape. The pivot lever 130 is partially disposed in the bracket 122 and extends from the fulcrum pin 128 through the hole 132 to a free end 118 spaced from the fulcrum pin 128. A nut may be slideably disposed over the fulcrum pin 128 to retain the lever on the fulcrum pin 128. An inner sleeve 134 may be disposed within the oblong shaped hole 132 for cushioning or covering any internal edges. The inner sleeve 134 may be formed from a flexible material, such as a plastic or a rubber material.

The release mechanism 92 includes a handle 136 coupled to the pivot lever 130 spaced along the pivot lever 130 from the fulcrum pin 128 and the second terminal 112. For example, as shown in FIG. 2, the handle 136 is coupled to the free end 118. Manual force is applied to the handle 136, i.e., the handle 136 is pulled, to rotate the latch 90 from the locked position to the unlocked position. In other words, the handle 136 is pulled to rotate the frame 42 about the first axis A towards the forwardly folded position.

Specifically, when force is applied to the handle 136, i.e., the handle 136 is pulled away from the frame 42, motion is transmitted from the handle 136 to the pivot lever 130, which in turn moves the motion transmitting cable 108, thereby moving the release pin 96 and the latch 90 against the bias of the latch spring 102. Applying force to the handle 136 moves the latch 90 out of the locked position and into the unlocked position such that the frame 42 may freely rotate towards the forwardly folded position. The handle 136 may be formed from a flexible material, such as a polymeric material, e.g., nylon. The handle 136 may be of any size and shape. It should be appreciated that without departing from the nature of the present invention the release mechanism 92 may have any configuration such that the release mechanism 92 moves the latch 90 from the locked position to the unlocked position.

Figure 6:
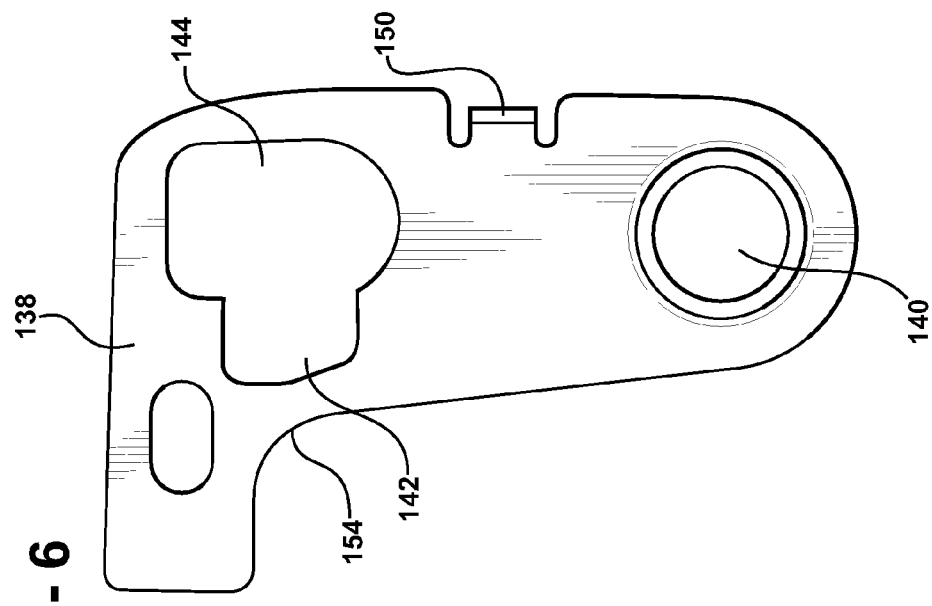
FIG. 6 is a side view of the inertia lock.

As best shown in FIGS. 4-6, the foldable headrest assembly 20 includes an inertia lock 138 rotatably coupled to the frame 42 for rotation from a neutral position to a triggered position in response to a deceleration of the frame 42, e.g., deceleration resulting from the vehicle 24 being involved in a collision. In the triggered position, the inertia lock 138 prevents the latch 90 from moving from the locked position to the unlocked position and thus prevents the frame 42 from rotating to the forwardly folded position. As such, during a collision, the frame 42 remains in the upright position and is prevented from inadvertently moving to the forwardly folded position.

Specifically, the inertia lock 138 defines a bore 140 receiving the shaft 66 with the inertia lock 138 rotatable about the shaft 66 between the neutral and triggered positions. The inertia lock 138 is rotatably supported on the shaft 66 adjacent to the first plate 58. When the frame 42 decelerates, e.g., during a collision, the momentum of the inertia lock 138 causes the inertia lock 138 to rotate about the shaft 66 to the triggered position.

As best shown in FIG. 6, the inertia lock 138 defines a stop slot 142 dimensioned to catch the release pin 96 in the triggered position and prevent the movement of the latch 90 from the locked position to the unlocked position. The inertia lock 138 also defines a cavity 144 extending from the stop slot 142.

The inertia lock 138 receives the release pin 96 in the stop slot 142 in the triggered position to engage and limit movement of the release pin 96 and maintain the latch 90 in the locked position. In other words, the stop slot 142 is sized such that, when the release pin 96 is disposed in the stop slot 142, the movement of the release pin 96 is confined such that the latch 90 is prevented from moving from the locked position to the unlocked position. More specifically, when the release pin 96 is disposed in the stop slot 142, the stop slot 142 allows for less movement of the release pin 96 than is necessary to move the motion transmitting cable 108 a sufficient distance to move the latch 90 from the locked to the unlocked position.

The release pin 96 is disposed in the cavity 144 in the neutral position. The cavity 144 is dimensioned to allow the release pin 96 to travel in the cavity 144 and the latch 90 to move between the locked and unlocked positions when the inertia lock 138 is in the neutral position.

The foldable headrest assembly 20 includes a lock biasing device 146 coupled to the inertia lock 138 and to the frame 42 for biasing the inertia lock 138 toward the neutral position. As best shown in FIG. 4, the lock biasing device 146 is further defined as a coil spring 148. A first spring lug 150 integrally extends from the inertia lock 138 towards the second plate 62. A second spring lug 152 integrally extends from the first plate 58. The lock biasing device 146 is connected to the first and second spring lugs 150, 152. The inertia lock 138 defines a stop surface 154 and the lock biasing device 146 urges the stop surface 154 into contact with the latch pivot pin 98 in the neutral position. It should be appreciated that the lock biasing device 146 is not limited to a coil spring but may be any type of biasing device without departing from the nature of the present invention.

FIG. 4 shows the inertia lock 138 in the neutral position. If the foldable headrest assembly 20 is moving forward at a speed and then decelerates from that speed, the inertia lock 138 will rotate forward away from the pivot pin against the bias of the lock biasing device 146 to the triggered position. In other words, momentum of the inertia lock 138 will cause the inertia lock 138 to move toward the triggered position when the vehicle 24 decelerates in speed. The stop slot 142 translates forward and engages the release pin 96 when the inertia lock 138 is in the triggered position. In the triggered position the release pin 96 cannot move within the stop slot 142 so that the release mechanism 92 is inoperable and the latch 90 may not be moved from the locked position to the unlocked position.

The coil spring 148 is formed at a spring constant to control the amount of momentum required for the inertia lock 138 to move from the neutral position to the triggered position. For example, the coil spring 148 may be formed such that the inertia lock 138 will move to the triggered position when decelerating at a certain rate, i.e., momentum of the inertia lock 138 overcomes the bias of the coil spring 148 such that the inertia lock 138 moves from the neutral position to the triggered position. Specifically, for example, the coil spring and the inertia lock may be sized such that the inertia lock 138 must be subjected to 7.8 g to overcome the resistance of the coil spring and move from the neutral position to the triggered position. The inertia lock 138 may experience 7.8 g when the vehicle 24 is involved in a collision. As known to one skilled in the art, "g" is a measure of g-force, i.e., a measurement of acceleration.

The foldable headrest assembly 20 may include a front shell and a rear shell adjacent to the front shell. The front shell and the rear shell cover and protect the frame 42, the latch 90, the release mechanism 92, and an upper portion of the rods 56, 60. The shells may be joined together my any means known in the art. For example, the shells may be snapped, glued, or screwed together. The shells may be formed from a flexible material, such as a plastic material. A pair of screws disposed proximal to the shaft 66 attaches the shells to holes defined by the plates 58, 62.

The headrest cover 48 may be placed over the foldable headrest assembly 20 in contact with the shells. Typically, the headrest cover 48 includes an outer skin, e.g., a fabric, matching an outer skin of the seat 22 and further includes an interior fill material, e.g., a foam layer or padding.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A foldable headrest assembly for a seat comprising:
   a post for engagement with an upper portion of the seat;
   a frame extending between a first end and a second end with said first end rotatably supported by said post for selective rotation of said frame relative to said post about a first axis;
   a latch moveably supported by said first end of said frame;
   a release pin mounted to said latch for movement with said latch;
   a release mechanism coupled to said latch for moving said latch and said release pin between a locked position with said latch engaging said post to prevent rotation of said frame about the first axis and an unlocked position with said latch disengaged from said post to allow rotation of said frame about the first axis; and
   an inertia lock rotatably coupled to said frame for rotation from a neutral position to a triggered position in response to deceleration of said frame and defining a stop slot dimensioned to catch said release pin in the triggered position and prevent the movement of said latch from the locked position to the unlocked position.

2. The foldable headrest assembly as set forth in claim 1 wherein said inertia lock defines a cavity extending from said stop slot with said release pin disposed in said cavity in the neutral position and with said cavity dimensioned to allow said release pin to travel in said cavity during said movement between the locked and unlocked positions.

3. The foldable headrest assembly as set forth in claim 1 further including a lock biasing device coupled to said inertia lock and to said frame for biasing said inertia lock toward the neutral position.

4. The foldable headrest assembly as set forth in claim 3 wherein said lock biasing device is further defined as a coil spring.

5. The foldable headrest assembly as set forth in claim 3 wherein said inertia lock defines a stop surface and further including a latch pivot pin extending from said first end of said frame with said lock biasing device urging said stop surface into contact with said latch pivot pin in the neutral position.

6. The foldable headrest assembly as set forth in claim 1 further including a latch pivot pin disposed in said frame and extending along a second axis offset from said release pin with said latch pivot pin coupled to said latch with said latch and said release pin rotatable relative to said frame about the second axis.

7. The foldable headrest assembly as set forth in claim 6 further including a latch spring supported by said latch pivot pin and coupled to said latch and to said first end of said frame for biasing said latch toward the locked position.

8. The foldable headrest assembly as set forth in claim 1 wherein said latch includes a tooth and said post defines a lock notch corresponding to said tooth with said tooth engaged with said lock notch in the locked position and with said tooth disengaged with said lock notch in the unlocked position.

9. The foldable headrest assembly as set forth in claim 1 wherein said release mechanism includes a sheath fixed relative to said frame and a motion transmitting cable extending in said sheath with said motion transmitting cable extending between a first terminal and a second terminal.

10. The foldable headrest assembly as set forth in claim 9 wherein said first terminal extends beyond said sheath with said first terminal coupled to said release pin of said latch.

11. The foldable headrest assembly as set forth in claim 9 wherein said release mechanism includes a fulcrum pin fixed relative to said frame and a pivot lever coupled to and pivotal about said fulcrum pin and wherein said second terminal extends beyond said sheath with said second terminal coupled to said pivot lever.

12. The foldable headrest assembly as set forth in claim 11 wherein said release mechanism includes a handle coupled to said release mechanism spaced along said pivot lever from said fulcrum pin and said second terminal.

13. The foldable headrest assembly as set forth in claim 1 wherein said frame is U-shaped with a base portion, a first arm extending from said base portion and presenting said first end, and a second arm spaced from said first arm and extending from said base portion in parallel with said first arm and presenting said second end.

14. The foldable headrest assembly as set forth in claim 13 further including a second post rotatably supporting said second end of said frame for engagement with the upper portion of the seat.

15. The foldable headrest assembly as set forth in claim 14 wherein each of said first end of said frame, said second end of said frame, said post, and said second post define an aperture and further including a shaft extending through and rotatable in each of said apertures.

16. The foldable headrest assembly as set forth in claim 15 further including a frame biasing device supported on said shaft and coupled to said post, said second post, and said frame with said frame biasing device urging said frame toward a forwardly folded position.

17. The foldable headrest assembly as set forth in claim 16 wherein said frame biasing device is further defined as a first torsion spring and wherein said frame includes a brace extending between and coupled to said first and second plates with said first torsion spring extending between and attached to said shaft and said brace.

18. The foldable headrest assembly as set forth in claim 15 wherein said inertia lock defines a bore receiving said shaft with said inertia lock rotatable about said shaft between the neutral and triggered positions.

19. The foldable headrest assembly as set forth in claim 14 wherein said first arm of said frame includes a first rod and a first plate attached to said first rod with said first plate presenting said first end and wherein said second arm of said frame includes a second rod and a second plate attached to said second rod with said second plate presenting said second end.

20. The foldable headrest assembly as set forth in claim 19 wherein said post and said second post each define a bend and wherein said first and second plates each include a first stop positioned to rest on said bend for supporting said frame in an upright position.

* * * * *